COLOR TRANSMISSION TRANSMITTER WITH PHASE CORRECTION MEANS

Filed Feb. 14, 1964

2 Sheets-Sheet 1

INVENTOR
Kenneth Geoffrey Baker
BY
Baldwin & Wight
ATTORNEYS

INVENTOR
Kenneth Geoffrey Baker
BY
Baldwin & Wight
ATTORNEYS 3,315,170
Patented Apr. 18, 1967

3,315,170

COLOR TRANSMISSION TRANSMITTER WITH PHASE CORRECTION MEANS

Kenneth Geoffrey Baker, Writtle, England, assignor to The Marconi Company Limited, London, England, a British company Filed Feb. 14, 1964, Ser. No. 345,001
Claims priority, application Great Britain, June 4, 1963, 22,051/63
5 Claims. (Cl. 328—155)

Figure 1:
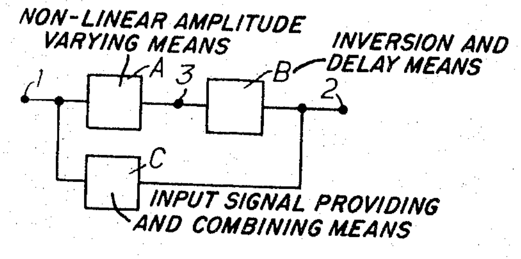

This invention relates to color television transmitters.

In certain color television systems there is employed for the transmission of color information, a radio frequency sub-carrier which is modulated with the so-called chrominance signals. In such systems it is necessary, if faithful transmission is to be achieved, that the phase of the sub-carrier as transmitted shall not change appreciably with changes of sub-carrier amplitude or with changes of so-called luminance signal level. The requirement that the phase of a signal, as transmitted, shall not vary with the amplitude arises in certain other color television systems also and is very difficult to satisfy. It is expensive and difficult to the point of impracticability to design broad band amplifiers and modulators, suitable for use in color television transmitters, which will not produce varying phase shifts with varying input amplitudes and, in the case of a color television transmitter of the kind in which the chrominance signals are sent as modulations of a sub-carrier (and in certain other color television transmitters) the occurrence of varying phase shifts in dependence on amplitude may result in serious color distortion in the colored pictures ultimately reproduced in a cooperating color television receiver. The present invention seeks to meet the foregoing difficulties. It does so by accepting, as its starting point, that constancy of phase shift independent of amplitude is probably not practically achievable in a color television transmitter and accordingly the invention provides improved amplitude-dependent phase shifting circuits which will produce amplitude-dependent phase shifts of such values as substantially to compensate for known amplitude-dependent phase shifts occurring in other circuits through which the signals must pass in a color television transmitter. In other words the invention provides amplitude-dependent phase correcting circuits for substantially compensating for undesired known amplitude-dependent phase shifts occurring in a color television transmitter.

According to this invention in its broadest aspect a color television transmitter includes in the video frequency portion thereof, a phase correcting circuit adapted to provide from input video frequency signals an output signal the phase of which is dependent in pre-determined manner upon input amplitude over a range of input amplitudes above a pre-determined value.

Preferably the phase correcting circuit is also such that the relation between output amplitude therefrom and input amplitude thereto is substantially constant over the whole range of input amplitudes thereto. That is, as stated, preferred but it is not essential and results which are acceptably good in many cases can be obtained even though there is substantial departure from the aforesaid constancy of output amplitude-input amplitude relation.

In the preferred way of carrying out the invention a phase correcting circuit comprises means for deriving from an input composite video waveform of the form $A \sin \omega t$ two derived waveforms which are nonlinearly related in predetermined manner thereto, and are of the forms $+B \sin \omega t_2$ and $-B \sin \omega(t_2+t_3)$ and means for adding the input waveform and the two derived waveforms to constitute a phase corrected output waveform. The nonlinear relationship is chosen to suit the nature of the phase correction required and may be adjustable. It may be obtained in simple cases by means of an amplifier circuit or amplitude varying means having two values of gain, one for input amplitudes below a pre-determined level and the other for input amplitudes above said pre-determined level. In more complex cases however it may be obtained by an amplifier circuit having more than two values of gain, the different values of gain being manifested for different, consecutive pre-determined ranges of input amplitudes.

According to another feature of this invention a color television transmitter includes in a video frequency portion thereof an amplitude-dependent phase correcting circuit including means for deriving from at least one selected portion of a composite input video signal train a derived signal having amplitudes which are related in pre-determined non-linear manner to the amplitudes of said signal train, means for combining said derived signal with the same signal inverted by a signal inversion means, the combination being effected after introduction of a pre-determined relative delay between the derived and the derived inverted signals, and means for combining the resultant of the aforesaid combination with the aforesaid signal train.

The invention is illustrated in and further explained in connection with the accompanying drawings in which FIG. 1 is a highly simplified block diagram and may be regarded as a key figure for FIGS. 2–8 inclusive; FIGS. 2–8 inclusive are diagrams showing various forms which may be adopted for certain of the blocks of FIG. 1; and FIG. 9 is an explanatory vector diagram.

Referring to FIG. 1 this shows between a composite video signal input terminal 1 and a phase corrected output signal terminal 2 a network consisting of three blocks A, B and C inter-connected as shown. The nature and purpose of the circuits in these blocks will be best understood from a consideration of FIGS. 2–8 inclusive which show different circuit arrangements for use in the various blocks.

Figure 2:
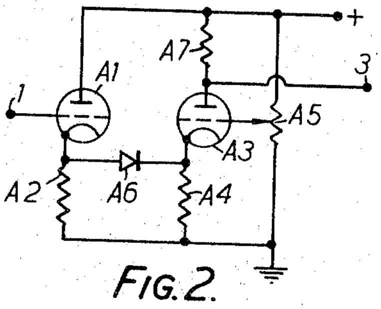

FIG. 2 shows one form of circuit arrangement which may be used in block A of FIG. 1. The purpose of this circuit arrangement is to derive from an input composite video waveform applied at terminal 1 a derived signal which is nonlinearly related to said input waveform and is formed from a selected portion thereof. The composite waveform of terminal 1 will ordinarily consist of a luminance video signal plus a chrominance modulated sub-carrier signal. Its general form is $A \sin \omega t_1$. To quote a practical example the sub-carrier period might be 0.25 $\mu$sec. which is equivalent to a sub-carrier frequency of 4 mc./s.

In FIG. 2 the signals at terminal 1 (FIGS. 1 and 2) are applied to the control grid of a valve A1 and corresponding signals appear across the resistance A2 in its cathode return. A second valve A3 with a resistance A4 in its cathode return has its control grid connected to the adjustable tap of a potentiometer A5 connected across the H.T. supply. A diode A6 is connected between the cathodes of the valves A1 and A3 and output is taken at terminal 3 from across a resistance A7 in the anode circuit of A3.

If the input potential of terminal 1 causes the potential across A2 to be more positive than that across A4 signal current will flow through the diode A6 and through the resistance A4 and because the cathode potential of A3 is held substantially constant by the grid potential of this valve the current through the anode resistance A7 will be reduced. An amplified reproduction of a portion of the input signal applied to the grid of A1—the portion above that value of potential at which the diode A6 conducts—therefore appears at the anode of valve A3 and is taken off at terminal 3. As will be apparent valve A3 acts both as a grounded grid amplifier for currents flowing through the diode A6 and as a cathode potential stabilizer.

Figures 3, 4:
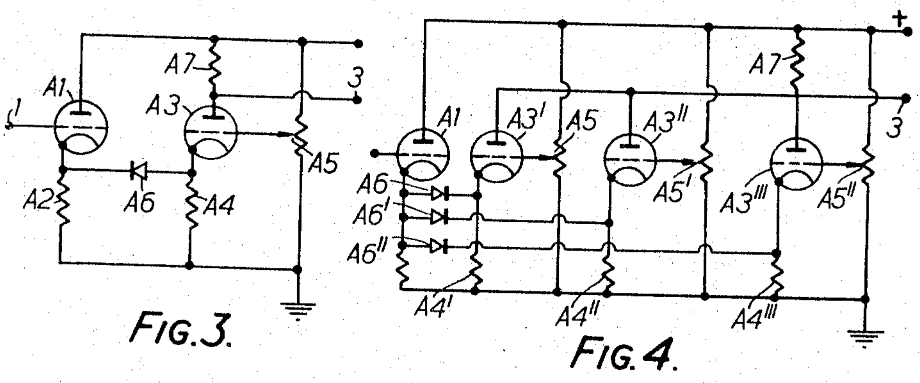

FIG. 3 shows a variant of FIG. 2 which may be used in block A of FIG. 1. The difference between FIGS. 2 and 3 lies only in the sense of connection of the diode A6. In the circuit of FIG. 3 if a signal at the cathode of valve A1 becomes more negative than the potential across resistance A4 there is current flow through the diode A6 and increase of the anode current through A3. In FIGS. 2 and 3 the portion of the input signal selected for reproduction in the output is determined by the point at which the diode A6 conducts, i.e. is determined by the adjustment of the potentiometer A5 and these arrangements may be regarded as arrangements which have one value of gain (actually zero gain) for inputs at one side of a pre-determined level and a different value of gain for inputs on the other side of this level.

FIG. 4 shows a modification of the arrangement of FIG. 2 (but FIG. 3 could be modified in like manner) wherein different portions of an input signal are selected for subjection to different values of gain, there being no gain for input signals below a certain level, a certain value of gain for input signals between that level and a somewhat higher level and, a higher value of gain for input signals above the second level. FIG. 4 is largely self explanatory and requires little further description. It comprises four valves A1, A3′, A3″ and A3‴ the latter three valves having cathode resistors A4′, A4″ and A4‴ respectively; three diodes A6, A6′ and A6″; and three potentiometers A5, A5′ and A5″. As will be apparent FIG. 4 contains in effect a triple repetition valve A3 of FIG. 2 and corresponding repeated parts in FIG. 4 are indicated by like references with one, two or three suffixed ticks. The output is obtained from across the resistance A7 in the anode of the valve A3.

FIGS. 2, 3 and 4 thus show forms of circuit which may be used to derive what is herein termed the B signal from the input or "signal."

Figure 5:
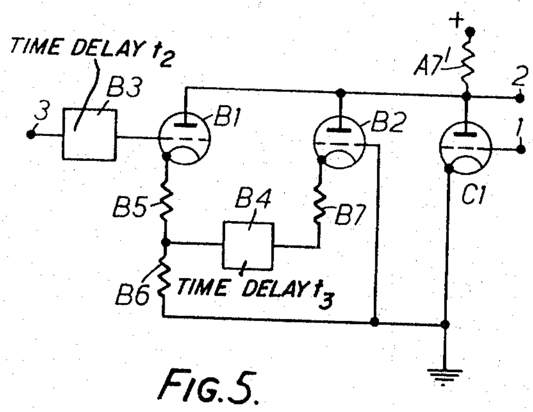

FIG. 5 shows one form of circuit which may be used for block B of FIG. 1. It derives from the B signal, signals of the form $\pm B \sin \omega(t_2 \pm t_3)$. Referring to FIG. 5, the circuit includes two valves B1 and B2 which form a cathode coupled phase splitter and a delay circuit or device B3 giving a delay $t_2$ connected between the control grid of B1 and the terminal 3 (which corresponds to terminal 3 in FIGS. 2, 3 or 4) at which the B signal appears. A further delay circuit or device B4 with a delay $t_3$ is connected on one side to a point intermediate two resistances B5 and B6 in the cathode return of the valve B1 and on the other side to the cathode of the valve B2 through a resistance B7. The signal generated at the anode of the valve A3 (FIG. 2, 3 or 4) is delayed by the delay $t_2$ and applied to the grid of valve B1. At low frequencies where $\omega t_3$ is negligibly small, signals of substantially 180 degrees phase difference will appear at the anodes of valves B1 and B2 and being of substantially equal amplitude they will substantially cancel. At subcarrier frequency the signal at the anode of valve B1 becomes $\pm B \sin \omega t_2$ and due to the action of the phase splitter and of the delay network B4 the signal at the anode of valve B2 becomes $\mp B \sin \omega(t_2 \pm t_3)$. The terminal 1 in FIG. 5 corresponds to the terminal 1 in FIG. 1. The valve C1 provides the signal from terminal 1 to terminal 2 and in so doing combines this signal with the signals at the anodes of valves B1 and B2. The valve C1 is the equivalent of the block C of FIGURE 1. Accordingly the arrangement of FIG. 5 produces and combines the signals $\pm B \sin \omega t_2$ and $\mp B \sin \omega(t_2 \pm t_3)$ at the anode connection of valves B1 and B2, and adds them to the signal from terminal 1 producing across the common anode load resistor A7′ a resultant combined phase corrected signal which appears at terminal 2 which corresponds to terminal 2 of FIG. 1. To quote practical figures the delays $t_2$ and $t_3$ might be, respectively, about $5 \times 10^{-9}$ sec. and from $8-10 \times 10^{-9}$ sec. Both could conveniently be obtained by lengths of co-axial cable.

Figure 6:
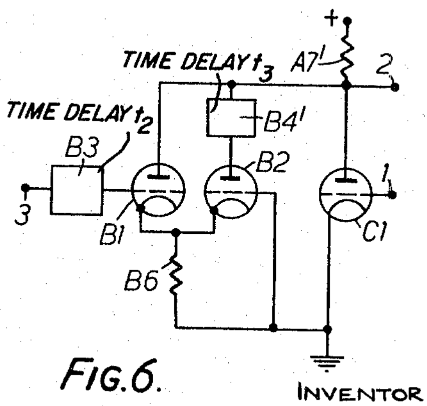

FIGURE 6 shows a modification of FIG. 5 differing therefrom, in that the delay $t_3$ is obtained by a delay circuit or device referenced B4′ and included in the anode circuit of valve B2 instead of between the cathodes of valves B1 and B2. Obviously a delay circuit giving the required delay $t_3$ could be inserted in the anode circuit of the valve B1.

Figure 7:
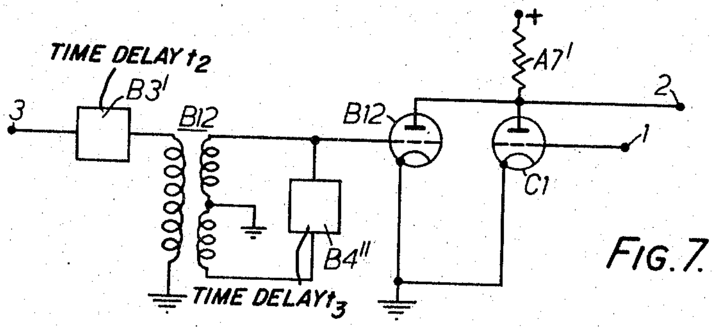

FIGURE 7 shows a further still modification of the arrangements of FIGS. 5 and 6. In this modification a transformer B12 is used in place of the valves B1 and B2, the delays $t_2$ and $t_3$ being obtained by delay circuits or devices B3′ and B4″ respectively connected as shown. The signals $\pm B \sin \omega t_2$ and $\mp B \sin \omega(t_2 \pm t_3)$ appear at the anode of a valve B12 connected as shown. Valve C1 performs the same function in FIG. 7 as in FIGS. 5 and 6.

Figure 8:
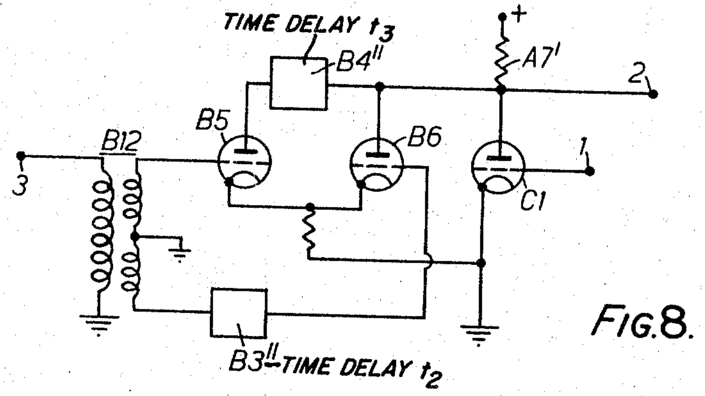
Figure 9:
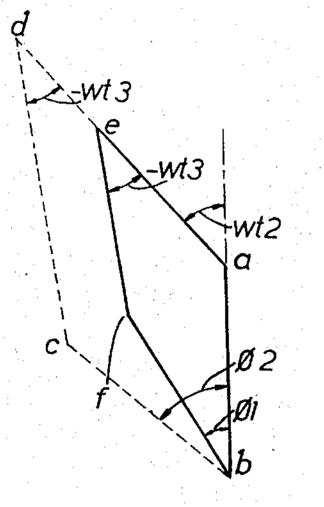

FIG. 8 shows a still further modification of the arrangement of FIG. 7 again using a transformer B12. In the arrangement of FIG. 8 the delays $t_2$ and $t_3$ are obtained by delay circuits or devices B3″ and B4‴ connected as shown, the latter being between the anodes of combining valves B5 and B6 and the former being between the grid of B6 and one end of the divided secondary of the transformer B12.

Results which are acceptably good in many cases may be achieved by omitting the delay circuits B3, B3′ or B3″ in FIGS. 5, 6, 7 or 8. If this be done there will not be a constant amplitude relation between output amplitude and input amplitude but in a good many cases some departure from the constant amplitude relation may be acceptable.

FIGURE 9 is a vector diagram explanatory of the operation of this invention. In FIG. 9 the vector *ab* represents $A \sin \omega t_1$; the vector *ae* represents $+B \sin \omega t_2$ and the vector *ef* represents $-B \sin \omega(t_2+t_3)$. The sum of the three vectors is, of course, the vector *bf* which is at a certain phase angle $\phi 1$ to the vector *ab*. The full lines of FIG. 9 are drawn for a particular ratio of A and B signal amplitudes. If this ratio changes a change of vector diagram as represented in part by the broken lines of FIG. 9 follows. In the new diagram vector *ab* again represents $A \sin \omega t_1$, vector *ad* represents $+B \sin \omega t_2$ and vector *cd* represents $-B \sin \omega(t_2+t_3)$. The vector sum has now become *cb* and the phase angle is increased from $\phi 1$ to $\phi 2$. At low frequencies $\omega t_3$ is very small causing vectors *ae* and *ef* and also vectors *ad* and *dc* to be substantially in antiphase and, being of the same amplitude, not contributory to the output signal.

I claim:

1. A color television transmitter including video frequency signal means for handling a composite video signal train, said video frequency signal means including amplitude dependent phase correcting means comprising amplitude varying means responsive to signals of said signal train within a preselected amplitude range for deriving signals having amplitudes which are non-linearly related to the amplitudes of said signal train, inversion means for inverting the signals derived from said amplitude varying means, delay means for introducing a predetermined relative delay between the signals derived by said amplitude varying means and the signals from said inversion means, first combining means for combining the signals derived by said amplitude varying means with the inverted delayed signals produced by said inversion and delay means, and second combining means for combining signals from said composite video signal train with the resultant signal from said first combining means.

2. A transmitter according to claim 1 further including means for adjusting the non-linear relation between the signals derived by said amplitude varying means and the signals in the signal train.

3. A transmitter according to claim 1 wherein said amplitude varying means comprises amplifier means for providing one value of gain for input amplitudes below a predetermined level and at least one other value of gain for input amplitudes above said predetermined level.

4. A transmitter according to claim 1 wherein said amplitude varying means comprises amplifier means for providing more than two values of gain, said amplifier means providing a different value of gain within each of a number of predetermined ranges of input amplitude.

5. In a color television transmitter; amplitude varying means responsive to video frequency input signals of varying amplitude for non-linearly varying the amplitude of said signals, inversion means for inverting the output of said amplitude varying means, delay means for delaying the inverted signals with respect to the amplitude varying signals, and means for combining the video frequency input signals, the amplitude varying signals and the delayed signals for producing a resultant signal the phase of which is dependent upon the amplitude of said video frequency input signals.

References Cited by the Examiner

UNITED STATES PATENTS

| | | | |
|---|---|---|---|
| 2,464,594 | 3/1949 | Mahoney | 328—155 X |
| 2,775,654 | 12/1956 | Weighton et al. | 330—95 X |
| 2,890,294 | 6/1959 | Cooper | 328—155 X |
| 2,950,440 | 8/1960 | Cooper | 328—155 |
| 3,201,694 | 8/1965 | Kahn | 328—155 X |

ARTHUR GAUSS, *Primary Examiner.*

JOHN JORDAN, *Assistant Examiner.*